Feb. 2, 1926.
1,571,534
J. WALDHEIM
COMPUTING MACHINE
Filed Dec. 14, 1920
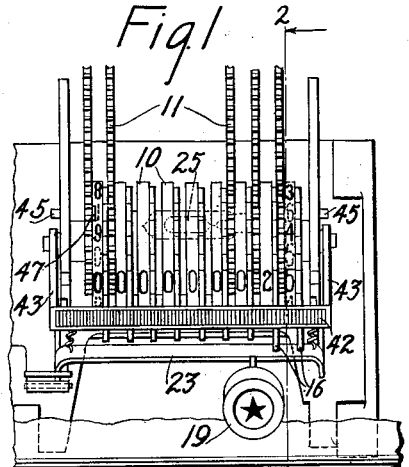
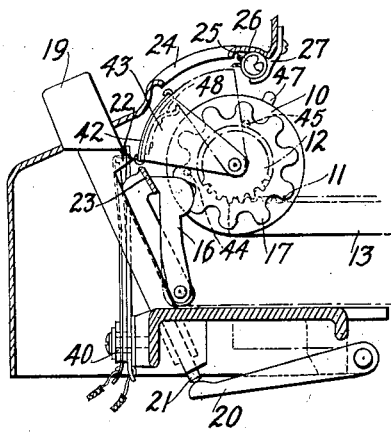
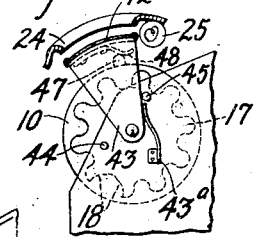
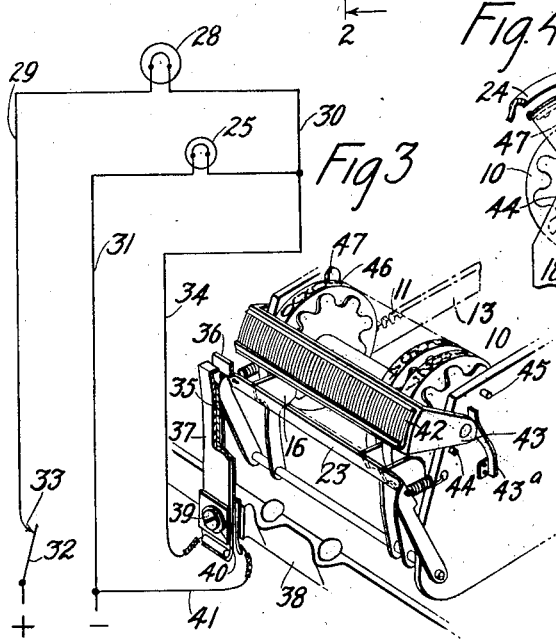
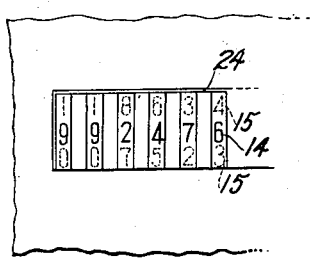
Inventor:
John Waldheim
by B.C. Stickney
Attorney Patented Feb. 2, 1926.

1,571,534

UNITED STATES PATENT OFFICE.

JOHN WALDHEIM, OF ELIZABETH, NEW JERSEY, ASSIGNOR TO UNDERWOOD COMPUTING MACHINE COMPANY, OF NEW YORK, N. Y., A CORPORATION OF NEW YORK.

COMPUTING MACHINE.

Application filed December 14, 1920. Serial No. 430,609.

*To all whom it may concern:*

Be it known that I, JOHN WALDHEIM, a citizen of the United States, residing in Elizabeth, in the county of Union and State of New Jersey, have invented certain new and useful Improvements in Computing Machines, of which the following is a specification.

This invention relates to registers of computing machines, especially those of the type known as the Underwood standard bookkeeping machine, by which both typewriting and computing are effected.

Heretofore, provision has been made in overdraft machines of dial-wheels or number-wheels having series of positive and negative numbers thereon, and of means to direct attention to one line of digits from which positive results are to be read, and two rows of negative numbers from which negative results are to be read. Provisions have also been made of means to light a register whenever any of the number-wheels thereof are displaced from zero positions, and to maintain such lighting until a zero setting of the number-wheels is again obtained.

The main object of the invention is to provide means whereby an indication of a positive or of a negative result may be given and attention called to the digits from which the result is to be read.

A feature of the invention resides in means for shifting a screen or shutter to and from a position to indicate a negative result. To this end, provision may be made of a dummy number-wheel in a register, in which subtraction may be effected by the complemental method, and the dummy number-wheel may be provided with a lug or member, which, as the dummy wheel changes from "0" to "9", due to the fact that a complete rotation is not effected because of a negative result, will engage a spring on the shutter or screen and move it to its abnormal position to indicate such negative result. It will be seen that each time subtraction is effected, the dummy number-wheel or dummy wheel will move the shutter or screen to effective position, the spring then yielding, as the dummy wheel continues to its position for a zero reading, and permitting the screen to return to its normal or ineffective position. In case a negative result is obtained, the dummy wheel will fail by one step to make a complete revolution, and, while effective to move the shutter or screen to effective position over the exposed digits, will not release the screen to enable its return to normal position.

Another feature of the invention resides in making the screen or shutter of transparent material of characteristic appearance, and in providing suitable lighting means to enable the numbers on the number-wheels to be read through said screen. The characteristic appearance of the screen may be obtained by making it of any desired color, such as red. For use with such a screen, the numbers of the different series on the number-wheels may be of different appearance to distinguish one kind of numbers from the other. To obtain such a result the numbers of each series may be given a characteristic formation or color.

Other features and advantages will hereinafter appear.

In the accompanying drawings,

Figure 1 is a view, taken from above, of a register of an Underwood-Hanson machine, with my invention applied thereto, the casing being broken away to show the underlying structure.

Figure 2 is a sectional view, taken along line 2—2 of Figure 1, looking in the direction of the arrows.

Figure 3 is a perspective view of the register mechanism, the lighting circuit being shown diagrammatically.

Figure 4 is a view similar to Figure 2, but with the screen or shutter in the position indicating a negative result.

Figure 5 is a view showing the digits on the number-wheels as seen through the sight-opening in the casing.

In the Underwood standard bookkeeping machine, register or number-wheels 10 are rotated by racks 11 meshing with pinions 12 having the usual one-way connections with the number-wheels 10. The racks 11 are on the front ends of pin-bars 13 on which pins may be indexed, and which may be driven by a general operator in the usual manner, as shown in the patent to Hans Hanson, No. 1,278,812, dated September 10, 1918.

Each of the number-wheels 10 is provided with one series of figures 14 for indicating positive results and with a second series of figures 15 for indicating negative results.

The figures or digits of the different series may, if desired, be differentiated from each other in any suitable manner, as by a color, the colors used in machines of this type usually being white for the numbers of the positive series and red for the numbers of the negative series. This difference in color is indicated in the drawings by representing black figures 14 in full lines and red figures 15 in broken lines.

As herein disclosed, the two series of figures on each number-wheel run consecutively from "0" to "9" in opposite directions, the figures of one series being so grouped with respect to those of the other that the sums resulting from the successive additions of any digit selected from figures of one series to the two adjacent digits of the other series will equal nine and ten, respectively. The number-wheels may be viewed through a sight-opening in the casing, such opening being of sufficient size to expose three rows of figures from which the readings are to be taken.

When using the machine for ordinary addition and subtraction, in which case the results will always be positive, the readings will be taken from the middle row of white numbers exposed at the sight-opening, but in case a number greater than the number shown in the middle row be subtracted therefrom, the correct number will not appear in the middle row of white figures, but may be read partly from the lower row of red figures and partly from the upper row of red figures, as brought out more fully in the application of Des Jardins, No. 307,391, filed June 28, 1919 (now Patent No. 1,369,791, dated March 1, 1921).

The number-wheels are held in any positions to which they may be moved by means of detents 16 engaging between teeth 17 fixed on said number-wheels and having cut-out portions or recesses 18 in the teeth engaged by the detents when the number-wheels are set at zero, for a purpose which will now be pointed out.

Machines of the type here disclosed are usually provided with means for proving the accuracy of copying the amount of the total or for proving that the machine is clear when work is begun. Such means comprises a star key 19 which effects printing by means of a star type-bar (not shown herein, but one form of which is shown in the patent to Hoyt, No. 1,256,309, dated February 12, 1918). The star type-bar is under the control of a rock-arm 20 upon which the lower end 21 of the star key 19 rests. Unless all of the wheels 10 in the register stand at zero, the star key 19 is locked by means of a lug 22 on the same, near the upper end of its stem, and a locking bail 23, which is held in the path of said lug whenever any wheel of the register shows a digit other than zero.

This control of the locking bail 23 is effected by means of the detents 16, which are held outwardly from the number-wheels sufficiently to maintain the locking bail 23 beneath the lug 22 unless all of the number-wheels are set at zero, in which case the detents 16 of all of the number-wheels seat themselves more deeply because of the cut-out portions or recesses 18 and enable the locking bail 23 to be withdrawn from beneath the lug 22.

Illumination of the rows of digits exposed at the sight-opening 24 may be effected by means of a miniature lamp 25 supported on a casing 26 just to the rear of the sight-opening by means of a bracket 27 secured to the casing. It will be seen that the lamp 25 is so positioned that the light therefrom will be reflected from the exposed rows of the number-wheels through the sight-opening. The lamp 25, which may be referred to as a register lamp, may be included in the lighting circuit in series with a suitable resistance 28, which may be a desk lamp, as indicated in Figure 3, by means of a main conductor 29 connected to the desk lamp 28, a second main conductor 30 connecting the desk lamp 28 to the register lamp and a conductor 31. When the machine is in operation, connection will be made from the positive pole to a suitable source of power by means of a finger-piece 32 with a contact 33 on the main conductor 29, and a current will then pass through the lamps 28 and 25 and the conductor 31 to the negative pole.

Provision may be made of means for extinguishing the register light 25 when all the number-wheels 10 stand at zero, and for lighting the same when any number-wheel of the register is moved away from its zero position. To obtain this result, a short circuit is provided through a conductor 34, the short circuit having a break therein when any number-wheel is moved away from its zero position. The short circuit through conductor 34 is normally maintained in open condition by the locking bail 23, one end of which engages a member 35 of insulating material between a stiff spring 36 and a flexible spring 37, all of which are secured to a rail 38 by means of a screw 39. It will be seen that springs 36 and 37 are insulated from the rail 38 and also from the screw 39 by a sleeve of insulating material 40 through which said screw passes. The locking bail 23 acts through the insulating member 35 to press the offset upper end of spring 37 away from spring 36, thereby maintaining a break in the short circuit which includes the conductor 34 connected with the spring 37 and the conductor 41 connecting the spring 36 with the negative pole. When, however, all of the number-wheels are brought to their zero positions, the detents 16 will be permitted, due to the cut-out portions in the teeth 17, to move closer to the axis of the number-wheels, and will permit the locking bail 23 to be moved sufficiently to the rear to enable the upper end of spring 37 to contact with the upper end of the stiff spring 36, thereby completing the circuit through conductors 34 and 41 and throwing the lamp 25 out of action. The means for controlling the register lamp is in general the same as that disclosed in the application of Frank W. Blake, Serial No. 384,312, filed May 26, 1920 (now Patent No. 1,438,814, dated December 5, 1922).

It has been found desirable to indicate by the color of the light at the sight-opening whether the result to be read from the exposed rows of digits is positive or negative, indicated by white or red, respectively. To this end provision is made of a transparent screen 42 of any suitable color, preferably red, pivotally supported by means of arms 43 on the shaft on which the number-wheels are supported. When the screen is in its normal position, shown in Figure 2, the arms 43 thereof rest on pin 44, and its movement away from its normal position is limited by means of pins 45 with which the arms 43 are brought in contact when the screen is positioned beneath the sight-opening. Provision may be made of a spring 43ª to assist in restoring the screen 42 to its normal position when displaced therefrom. It will be seen that the light reflected from the exposed rows will pass through the screen, when the latter is in raised position, and through the sight-opening where a red color will be shown.

In order to move said screen 42 to its Figure 2 position when a negative result is obtained, provision is made of a dummy number-wheel 46, driven also by a rack 11 and positioned adjacent the number-wheel of highest denomination and provided with a lug 47, which, at a certain time in the revolution of the dummy number-wheel, will engage a spring or finger 48 fastened on the lower side of the screen and will advance the screen 42 to its limiting position determined by pins 45, the position assumed by the dummy number-wheel, as seen in Figure 4, being that in which a positive "9" is shown at the position normally occupied by the zero of the positive series. Upon further movement of the dummy number-wheel, the spring 48 will yield and the screen will drop back to its normal position. Obviously some or all of the markings on the dummy number-wheel may be omitted or indicia other than numerals may be placed thereon.

In machines of the Underwood-Hanson type, in indexing for subtraction, all of the "9" pins are set, and later, when digits are indexed on various bars, the "9" pins on such bars are restored to normal position, and upon actuation of the general operator the successive number wheels of the higher denominations in which no digits have been indexed will be given complete rotations, nine steps due to the setting of the "9" pins and a single step due to the carry-over mechanism, unless the number subtracted from that already in the register is greater than the latter, in which case "9"'s will be shown in the denominations above the digit of the highest denomination in the complement of the correct negative result. In this connection, it may be stated that the rack 11 associated with the dummy number-wheel 46 may be provided with a single pin corresponding to the "9" pins of the other racks 11, settable concomitantly with the "9" pins when subtraction-setting is effected.

It will be apparent that in the present mechanism each time the general operator is actuated in effecting subtraction with a positive result, the dummy number-wheel will be given a complete rotation, and while the lug 47 will engage the spring 48 and carry the screen across the sight-opening, it will pass beyond such point and the screen will be released and permitted to return to its normal position. In case of a negative result, however, as is well known, the dummy number-wheel will not be given a complete rotation, but will lack one step thereof, so that its final position will be that shown in Figure 4, with the color screen lying beneath the sight-opening, and red light will be shown at such opening indicating a negative result. It will be evident that the present invention will be of material assistance in calling the attention of the operator to the positive or negative character of the result.

The numbers of each series on the dial wheels may both be white but distinguished from each other, as indicated, by full and dotted numbers; the negative result being read from the dotted numbers.

Variations may be resorted to within the scope of the invention, and portions of the improvements may be used without others.

Having thus described my invention, I claim:

1. In a computing machine, in combination, a register comprising number-wheels provided with series of positive and negative digits of different appearance, a screen through which the digits can be seen, a dummy number-wheel, and means for holding said screen in a position to indicate a negative result whenever the dummy number-wheel assumes at the end of a subtraction computation a position in which the "9" of the positive series assumes the position normally occupied by the "0" of the positive series, said means constructed to permit the return of the screen to its normal position when the dummy-wheel is moved to any other position.

2. In a computing machine, in combination, a register comprising number-wheels having thereon digits of a positive and of a negative series, the digits being of different appearance to distinguish those of one series from those of the other, a dummy number-wheel adjacent the number-wheel of highest denomination, a lug on said dummy number-wheel, a screen for the exposed digits, movable to and from a position to indicate when the result is negative, and a device on said screen and in the path of said lug to enable movement of the screen to effective position by said dummy number-wheel.

3. In a computing machine, in combination, a register comprising number-wheels provided with series of positive and negative digits of different appearance, a dummy number-wheel adjacent the number-wheel of highest denomination, a lug on said dummy number-wheel, a screen for the digits exposed in said register movable to and from a position to indicate a negative result, and a spring device on said screen and in the path of said lug adapted to co-operate with said lug to enable movement of the screen to negative-result-indicating position, and to yield and thereby break the connection with the lug when the dummy number-wheel is advanced beyond its negative-result-indicating position.

4. In a computing machine, in combination, a register comprising number-wheels provided with series of positive and negative digits of different appearance, a screen mounted for movement to a position over the exposed digits of the register and back to normal position, a spring on said screen, and a dummy number-wheel adapted to co-operate with said spring to move the screen to effective position to indicate a negative result, the connection between the spring and the dummy number-wheel being broken when the latter is carried beyond its negative-result-indicating position.

5. In a computing machine, in combination, a register comprising number-wheels provided with series of positive and negative digits of different appearance, a translucent screen for said number-wheels, a dummy number wheel adjacent the number-wheel of highest denomination and advanceable thereby, and means actuable by advance of the dummy number-wheel for moving said screen to a position between the digits on the number-wheels and the eye of the operator to notify the operator when the result is negative, and for releasing the screen upon further advance of the dummy number-wheel by the wheel of highest denomination.

6. In an algebraic computing machine, in combination, a register having computing wheels with positive and negative digits of characteristic appearance thereon, three rows of digits being exposed, a transparent screen of characteristic appearance, and means whereby when a negative result is obtained said screen will be shifted to cover said three rows of digits, thereby indicating that a negative reading is to be taken.

7. In a computing machine, in combination, a register comprising number-wheels having thereon positive and negative digits of distinctive appearance, three rows of digits being always exposed to enable positive results to be read from the middle row and negative results to be read from the other two rows, a transparent screen to indicate, when positioned to cover the digits from which results are read, that the result is negative, a dummy number-wheel, and means whereby said dummy number-wheel will cause said screen to be in negative-result-reading position when said dummy number-wheel is positioned with the positive "9" thereon in a position normally occupied by the "0".

8. In an algebraic computing machine, in combination, a register having number-wheels with positive and negative digits of different appearance thereon, a shield having a sight-opening through which one row of positive digits and one row of negative digits on each side thereof may be exposed to permit positive results to be read from the first-mentioned row and negative results to be read from the other two rows, a lamp positioned beneath said shield, so that the light therefrom will be reflected from the exposed rows of digits through the sight-opening, and means to change, when a negative reading is to be taken, the color of the light from said lamp that reaches the eye of the operator.

9. In an algebraic computing machine, in combination, a register having number-wheels with positive and negative digits of different appearance thereon, a shield having a sight-opening through which one row of positive digits and one row of negative digits on each side thereof may be exposed to permit positive results to be read from the first-mentioned row and negative results to be read from the other two rows, a lamp positioned beneath said shield, so that the light therefrom will be reflected from the exposed rows of digits through the sight-opening, a transparent colored screen, and means whereby, upon obtaining a negative result, said screen will be moved to a position to intercept the light proceeding from said lamp and reflected from the exposed rows of digits, so that the color seen in said sight-opening will indicate that the result is negative.

10. In an algebraic computing machine, in combination, a register having number-wheels with positive and negative digits thereon, a shield having a sight-opening through which the result of the computation may be read, a lighting device positioned behind said shield, so that the light therefrom will be reflected from the number-wheels through the sight-opening, and means whereby the color of the light from said device as seen at said sight-opening will be changed each time the result changes from positive to negative or vice versa.

11. In an algebraic computing machine, in combination, a register having number wheels with positive and negative digits thereon, a shield having a sight-opening through which positive results may be read from positive digits and negative results from negative digits, a lighting device positioned behind said shield, so that the light therefrom will be reflected from the number-wheels through the sight-opening, and means whereby, when the result changes from one character to the other, the color of the light from said lighting device reflected from the number-wheels through said sight-opening will be changed to indicate such change in character of the result.

12. In an algebraic computing machine, in combination, a register having number-wheels with positive and negative digits thereon, a shield having a sight-opening through which one row of positive digits and one row of negative digits on each side thereof may be exposed to permit positive results to be read from the first-mentioned row and negative results to be read from the other two rows, a lighting device positioned behind said shield, so that the light therefrom will be reflected from the number-wheels through the sight-opening, a transparent colored screen, and means whereby, upon changing from one kind of result to the other, the screen will be shifted and consequently the color seen in said sight-opening changed.

13. In an algebraic computing machine, in combination, a register having number-wheels with positive and negative digits thereon, a shield having a sight-opening through which results may be read, a lighting device behind said shield, and means whereby, upon change of the result from one character to the other, the color of the light will be changed at said sight-opening.

14. In an algebraic computing machine, in combination, a register having number-wheels with positive and negative digits thereon, a shield having a sight-opening through which results may be read, a lighting device behind said shield, and means, including a transparent screen shiftable from one position to the other of two positions, whereby, upon change of the result from one character to the other, the color of the light at said sight-opening will be changed.

15. In an algebraic computing machine, in combination, a register comprising number-wheels and means to indicate the result to be read from said wheels, including a transparent colored screen for the number-wheels settable to two positions, and means whereby said screen will be shifted when the character of said result is changed.

16. In an algebraic computing machine, in combination, a register comprising number-wheels provided with a series of positive and negative digits, a shield having a sight-opening through which the results may be read from said wheels, a transparent screen of characteristic appearance normally at one side of said sight-opening, and means whereby, when the result changes from positive to negative, said screen will be shifted to cover said sight-opening.

17. In an algebraic computing machine, in combination, a register having number-wheels with positive and negative digits thereon, a shield for said number-wheels having a sight-opening, a lighting device behind said shield, and means whereby the color of the light from said lighting device at said sight-opening will be varied in accordance with the positive or negative character of the result.

18. In an algebraic computing machine, in combination, a register having number-wheels with digits thereon from which positive and negative results may be read, a shield for said number-wheels having a sight-opening, a color device through which numbers may be read when properly positioned with respect to said sight-opening, and means to shift said color device from one of two positions to the other in accordance with the change in the positive or negative character of the result.

19. In a machine of the kind described, a plurality of numeral-bearing elements for indicating the results of computations, means to indicate to the operator the positive or negative character of a result, and more noticeable indicating means automatically operable to afford further assurance that the operator shall be informed of the positive or negative character of the result.

20. In a computing machine, in combination, a register comprising number-wheels provided with series of positive and negative digits of different appearance, a transparent screen for said number-wheels, a dummy number-wheel adjacent the number-wheel of highest denomination, means to give the dummy number-wheel a complete revolution when a positive difference is obtained and one step less than a complete revolution when a negative difference is obtained, and automatic means operable by said dummy number-wheel to move the screen to and retain it in operative position when a negative difference is obtained and to move it into effective position and then release it when a positive difference is obtained.

21. In an algebraic computing machine, the combination of a register comprising dials having positive and negative digits thereon, a shield for said dials having a sight-opening to expose positive digits and negative digits from which negative results may be read, and means operable by the dials for indicating the positive or negative character of the result, said indicating means comprising a signal normally behind said shield but shiftable to a display position at said sight-opening when the result in the register changes from positive to negative.

22. In a computing machine, the combination of a register comprising dials having digits thereon the dials rotatable always in the same direction, a shield for said dials having a sight-opening through which positive and negative results may be read, and means operable by the dials for indicating the positive or negative character of the result, said indicating means comprising a signal normally behind said shield but shiftable to a display position at said sight-opening when the result changes from positive to negative and away from said display position when the result changes from negative to positive.

23. In a computing machine, a register comprising a set of number-wheels rotatable about a common axis and a shield having a sight-opening, and a transparent screen mounted to swing about said axis to and from a position across said sight-opening.

JOHN WALDHEIM.